United States Patent [19]

Hoffmann

[11] Patent Number: 4,482,118

[45] Date of Patent: Nov. 13, 1984

[54] ADJUSTING BASE FOR GEODETIC INSTRUMENTS

[75] Inventor: Dieter Hoffmann, Buchs/AG, Fed. Rep. of Germany

[73] Assignee: Kern & Co. AG, Aarau, Switzerland

[21] Appl. No.: 384,389

[22] Filed: Jun. 2, 1982

[30] Foreign Application Priority Data

Jun. 18, 1981 [CH] Switzerland .................. 4026/81

[51] Int. Cl.³ ............................................. F16M 3/00
[52] U.S. Cl. ................................... 248/180; 248/673
[58] Field of Search ............... 248/180, 187, 176, 179, 248/178, 673, 310

[56] References Cited

U.S. PATENT DOCUMENTS 2,844,342  7/1958  Anderson ........................... 248/673
2,950,155  8/1960  Schick ................................. 211/163
4,244,547  1/1981  Kooi .................................... 248/180
4,254,925  3/1981  Kooi .................................... 248/180
4,347,013  8/1982  Turner et al. ....................... 248/187
4,365,779  12/1982  Bates et al. ......................... 248/179

Primary Examiner—William H. Schultz
Assistant Examiner—Ramon O. Ramirez

[57] ABSTRACT

This invention provides an adjusting base for geodetic instruments.

By a double function of a clamping ring the adjusting base may be used with both instruments with a standard central single peg and instruments with more pegs arranged around a common center. Various interchangeable parts enable the adjusting base to be used on all known tripods and pillar plates.

7 Claims, 2 Drawing Figures

ADJUSTING BASE FOR GEODETIC INSTRUMENTS

BACKGROUND OF THE INVENTION

This invention relates to an adjusting base for geodetic instruments with a levelling upper part receiving the instrument.

Such known adjusting bases are either fixedly joined to the geodetic instrument or they have a receptacle for such instruments. German DE-OS No. 2 558 759 (Ertel-Werk) shows a surveying instrument with a levelling base in place of the usual tribrach. The levelling base may be put on a plane head of tripod. When the instrument upper part is tilted its annular spherical face glides on a corresponding face of a lower supporting plate.

German DE-AS No. 1 269 370 (Carl Zeiss) shows an adjusting base removable from an instrument. This base is carried by a head of tripod plate by means of supporting bolts. It may thus be centered on the plate while a rotation between base and plate is prevented by a guiding plate arranged between base and plate. This guiding plate has slots for guiding the supporting bolts and pins secured to the head of tripod plate. Swiss CH-PS No. 447 632 (Carl Zeiss) shows a ball socket base for surveying instruments likewise removable from the instrument. This base has a ball joint for coarse levelling and a tribrach for fine levelling. The tribrach is joined to a lower supporting plate in a torsion-proof way by means of a ring-shaped metal membrane. This ball socket base has a socket with a radial clamping screw provided in the tribrach for receiving a standard peg (DIN-standard 18719) of the surveying instrument to be levelled.

The ball socket base according to CH-PS No. 447 632 (Carl Zeiss) may only be used for receiving standard pegs of surveying instruments. Other levelling bases are known for use with other instruments. These bases, however, cannot receive standard pegs. Such a known levelling base for surveying instruments made by Wild-Heerbrugg, Switzerland, has an instrument receptacle carried by three adjusting screws resting on a supporting plate. The instrument receptacle has three bores to receive three pegs of an instrument. The three pegs are clamped to the receptacle by means of a ring with three blades turnable around the receptacle axis and a rotary drive gear.

An object of this invention is to provide an adjusting base for geodetic instruments, which is suitable for both instruments with a standard peg and other instruments.

SUMMARY OF THE INVENTION

An adjusting base for geodetic instruments is provided with a levelling upper part receiving the instrument comprising:
(a) a central single socket for receiving an instrument with a corresponding single peg and
(b) a set of sockets around the central single socket and a corresponding centering socket for receiving an instrument with a set of corresponding pegs.

This invention is particularly characterized by the upper part having a ring with means for manual turning around the axis of the upper part, the ring having a cam profile for clamping the central single peg and a set of blades for clamping the set of pegs. Preferably, the upper part comprises a first ring with means for manual turning around the axis of the upper part and a second ring rotationally fixed to the first ring but radially shiftable thereto, the second ring having a cam profile for clamping the central single peg and the first ring having a set of blades for clamping the set of pegs. The central single socket has an internal groove with an inset annular spring and a radially displaceable pin at the circumference of the groove, the pin clamping an inserted single peg of an instrument by means of the annular spring when forced inward by the cam profile of the turnable ring. Preferably, the adjusting base comprises a supporting plate on which the upper part is levelled by means of three adjusting screws. The supporting plate has interchangeable parts arranged at its center for securing it on a base.

Other objects, features and advantages of the invention will be apparent from the following detailed description taken in connection with the accompanying drawings.

DETAILED DESCRIPTION OF THE INVENTION

Figure 1:
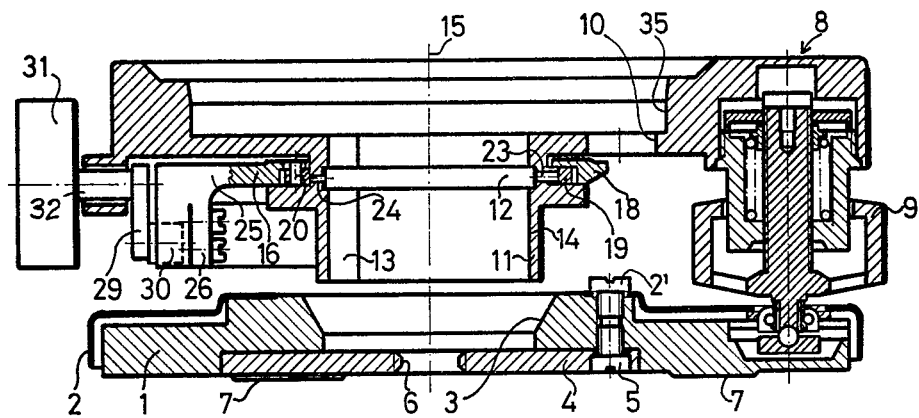
FIG. 1 is a partial section of an adjusting base for geodetic instruments according to this invention.
Figure 2:
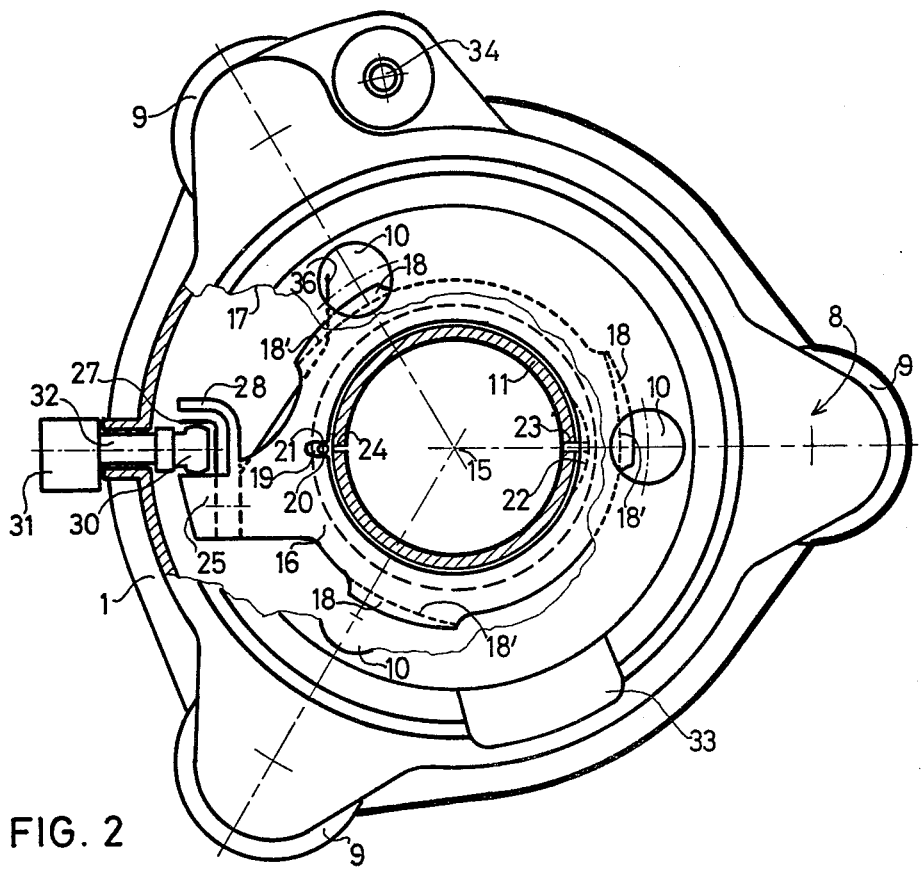
FIG. 2 is a top view of the adjusting base shown in FIG. 1.

Referring to FIGS. 1 and 2 the adjusting base has a supporting plate 1 provided with a casing 2 and a central aperture 3. The casing 2 is mounted on the supporting plate 1 by screws 2' in such a way that it keeps in place three adjusting screws 9 anchored at the outer rim of supporting plate 1. At the lower end of aperture 3 an annular interchangeable part 4 is inserted by screws 5. Part 4 has an internal screw thread 6 for screwing it to a base (not shown). A good seat on such a base is provided by three feet 7 symmetrically arranged at the supporting plate 1.

An upper part 8 is carried on the supporting plate 1 by three adjusting screws 9 for levelling, only one screw 8 being shown in the partial section of FIG. 1. For receiving a geodetic instrument the upper part 8 has a combination of three long holes 10 at its circumference with a centering socket 35 as well as a central single socket 11. The long holes 10 have a slight radial extension and are provided to receive three corresponding pegs attached to the geodetic instrument (not shown). The upper part of the central single socket 11 has an internal groove 12 with an inset annular open spring 40 reaching over about 9/10 of its circumference. Socket 11 is in correspondence to the standard DIN 18719. Moreover this socket 11 has a portion 13 (FIG. 1) over about ¼ of its circumference, where a recess with a smaller radius is provided as a seat when clamping a corresponding peg attached to the geodetic instrument. To provide a stable support for such a peg known as such, the upper part 8 has an extension 14 embracing the socket 11.

For clamping a peg according to the invention a ring 16 is provided, which may be turned around the axis 15 of the upper part 8 with a radial clearance. The ring 16 is shown in FIG. 2 within an area 17 due to a partial section of the upper part 8. The rest of ring 16 is represented in broken lines. As shown in FIG. 1 ring 16 is guided axially in an outer ring groove of the extension 14. The ring 16 has three blades 18 (FIG. 2) at its outer rim for clamping of three pegs inserted into the long holes 10. The blades 18 are wedge-shaped as shown by the broken lines 18' of FIG. 2, thus they engage indentations of the pegs by turning ring 16, the geodetic instrument being centered by centering socket 35 and clamped by the pegs.

At its inner border ring 16 has a recess extending axially over part of its breadth. A second smaller ring 19 is inserted in the recess of ring 16 with a radial clearance. A pin 20 is attached to ring 19 in parallel to axis 15. Pin 20 engages a U-shaped recess 21 of ring 16 from below in order to carry ring 19 upon turning of ring 16. A further recess with a cam profile, represented by broken line 22 of FIG. 2 is provided at the inner border of ring 19. A pin 23 guided by a radial bore of extension 14 is pressed on to the cam profile of ring 19 by the annular open spring 40 set into the internal groove 12 of the central single socket 11. Opposite to movable peg 23 another peg 24 is fixed to the internal groove of extension 14 at the open space of the annular spring to prevent a turning of the spring within the groove.

In view of the above, a turning of ring 16 effects an equal turn of ring 19 and consequently a radial shift of pin 23 by cam profile 22 to squeeze the annular open spring 40. A corresponding peg, when inserted into socket 11 is thus clamped by means of pin 23 and the annular spring set into groove 12 by pressing the peg on to portion 13 of socket 11.

For turning, ring 16 has an extension 25 forming an arm 26 angled parallel to the axis 15. An angle spring 27 with a corresponding limiting angle 28 is screwed to arm 26. Thus, a slide way between arm 26 and spring 27 parallel to axis 15 is provided for a driving log 30 rotatably attached to a lever 29. Lever 29 may be pivoted around an axis 32 manually by means of a locking handle 31 for effecting the turn of ring 16 required for clamping as described above. Together with angle spring 27 a laminated spring 36 is screwed to arm 26, spring 36 reaching out to one blade 18 of ring 16 and providing, at a clamping action, a close lateral contact of an instrument peg inserted in the corresponding long hole 10 by lateral pressure on the peg.

Moreover, the upper part 8 has a recess 33 to receive a known projecting part of a geodetic instrument and a spherical level 34 is provided for levelling by means of adjusting screws 9. Thus, by operating locking handle 31 a double function is performed according to the invention, namely clamping of a standard peg inserted into the central single socket 11 or clamping of three instrument pegs inserted into the long holes 10 and attached to a centering peg of the instrument, the centering peg being inserted into the centering socket 35.

Various interchangeable parts 4 enable the adjusting base to be used on all known tripods and pillar plates.

The foregoing detailed description has been given for clearness of understanding only, and no unnecessary limitations should be understood therefrom, as some modifications will be obvious to those skilled in the art.

What is claimed:

1. An adjusting base for geodetic instruments with a levelling upper part receiving the instrument, the upper part having a central single socket for receiving an instrument with a corresponding single peg and a set of sockets around the central single socket and a corresponding centering socket for receiving an instrument with a set of corresponding pegs, the upper part comprising a ring with means for manual turning substantially around the axis of the upper part, the ring having a cam profile for clamping the central single peg and a set of blades for clamping the set of pegs.

2. The adjusting base of claim 1, wherein the upper part comprises a first ring with means for manual turning substantially around the axis of the upper part and a second ring rotationally fixed to the first ring but radially shiftable thereto, the second ring having a cam profile for clamping the central single peg and the first ring having a set of blades for clamping the set of pegs.

3. The adjusting base of claim 1 or of claim 2, wherein the central single socket has an internal groove with an inset annular spring and a radially displaceable pin at the circumference of the groove, the pin clamping an inserted single peg of an instrument by means of the annular spring when forced inward by the cam profile of the turnable ring.

4. The adjusting base of claim 3, further comprising a supporting plate on which the upper part is levelled by means of three adjusting screws.

5. The adjusting base of claim 4, wherein the supporting plate has interchangeable parts for securing it on a base.

6. The adjusting base of claim of 5, further comprising means for screwing it to the geodetic instrument.

7. The adjusting base of claim 6, wherein the interchangeable parts for securing are arranged at the center of the supporting plate.

* * * * *